US009878806B2

(12) United States Patent
Helmer et al.

(10) Patent No.: US 9,878,806 B2
(45) Date of Patent: Jan. 30, 2018

(54) ON-ORBIT ASSEMBLY OF COMMUNICATION SATELLITES

(71) Applicant: Space Systems/Loral, LLC, Palo Alto, CA (US)

(72) Inventors: Robert Edward Helmer, Pleasanton, CA (US); John Douglas Lymer, Toronto (CA)

(73) Assignee: Space Systems/Loral, LLC, Palo Alto, CA (US)

( * ) Notice: Subject to any disclaimer, the term of this patent is extended or adjusted under 35 U.S.C. 154(b) by 338 days.

(21) Appl. No.: 14/642,486

(22) Filed: Mar. 9, 2015

(65) Prior Publication Data
US 2016/0264264 A1 Sep. 15, 2016

(51) Int. Cl.
*B64G 1/22* (2006.01)
*B64G 1/66* (2006.01)
*B64G 4/00* (2006.01)
*B64G 1/64* (2006.01)

(52) U.S. Cl.
CPC ............. *B64G 1/222* (2013.01); *B64G 1/66* (2013.01); *B64G 4/00* (2013.01); *B64G 1/641* (2013.01); *B64G 2004/005* (2013.01)

(58) Field of Classification Search
CPC . B64G 1/222; B64G 4/00; B64G 1/66; B64G 1/641; B64G 2004/005
See application file for complete search history.

(56) References Cited

U.S. PATENT DOCUMENTS

| 4,585,388 A | | 4/1986 | Gossain et al. | |
|---|---|---|---|---|
| 4,667,908 A | * | 5/1987 | Hayden | B64G 1/14 244/172.5 |
| 4,834,325 A | * | 5/1989 | Faget | B64G 1/12 136/245 |

(Continued)

FOREIGN PATENT DOCUMENTS

WO    WO 2006/092625    9/2006

OTHER PUBLICATIONS

McGregor et al., "Flight 6A: Deployment and Checkout of the Space Station Remote Manipulator System (SSRMS)," Proceeding of the 6th International Symposium on Artifical Intelligence and Robotics & Automation in Space: i-SAIRAS 2001, Canadian Space Agency, St-Hubert, Quebec, Canada, Jun. 18-22, 2001, Canadian Space Agency, 6767 Route de l'Aeroport, St-Hubert, Quebec, Canada, J3Y 8Y9, 9 pages.

(Continued)

*Primary Examiner* — Valentina Xavier
(74) *Attorney, Agent, or Firm* — Weaver Austin Villeneuve & Sampson LLP

(57) ABSTRACT

A spacecraft including a main body structure and at least a first deployable element is reconfigured from a launch configuration to an on-orbit configuration. In the launch configuration, the first deployable element is mechanically attached with the spacecraft main body structure by way of a first arrangement. In the on-orbit configuration, the first deployable element is mechanically attached with the spacecraft main body structure by way of a second arrangement. Reconfiguring the spacecraft includes detaching the first deployable element from the first arrangement, moving the first deployable element with respect to the spacecraft main body structure; and attaching the first deployable element to the second arrangement.

10 Claims, 6 Drawing Sheets

(56) References Cited

U.S. PATENT DOCUMENTS

| | | | |
|---|---|---|---|
| 4,926,181 A | | 5/1990 | Stumm |
| 4,929,009 A | | 5/1990 | Vandersluis et al. |
| 5,145,130 A | * | 9/1992 | Purves ................. B25J 5/00 244/159.4 |
| 5,372,340 A | * | 12/1994 | Ihara ................. B64G 1/1085 244/172.5 |
| 5,996,940 A | * | 12/1999 | McVey ................. B64G 1/22 244/172.9 |
| 7,114,682 B1 | | 10/2006 | Kistler et al. |
| 8,448,902 B2 | | 5/2013 | Gelon |
| 8,789,796 B2 | | 7/2014 | Boccio et al. |
| 9,004,409 B1 | | 4/2015 | Baghdasarian |
| 2004/0150580 A1 | * | 8/2004 | Gaudette ............ H01Q 1/288 343/878 |
| 2006/0044213 A1 | | 3/2006 | Carroll et al. |
| 2007/0146227 A1 | * | 6/2007 | Brooks ............... B64G 1/222 343/881 |
| 2007/0200780 A1 | | 8/2007 | Hentosh et al. |
| 2010/0103073 A1 | | 4/2010 | Texier et al. |

OTHER PUBLICATIONS

Laryssa et al., "International Space Station Robotics: A Comparative Study of ERA, JEMRMS and MSS," 7th ESA Workshop on Advanced Space Technologies for Robotics and Automation 'ASTRA 2002' ESTEC, Noordwijk, The Netherlands, Nov. 19-21, 2002, 8 pages.

International Search Report and Written Opinion dated May 30, 2016 issued in PCT/US2016/021213.

* cited by examiner

ON-ORBIT ASSEMBLY OF COMMUNICATION SATELLITES

TECHNICAL FIELD

This invention relates generally to communications satellites, and more particularly to improved techniques for reconfiguring a satellite from a launch configuration to an on-orbit configuration.

BACKGROUND

The assignee of the present invention manufactures and deploys spacecraft for, inter alia, communications and broadcast services. Market demands for such spacecraft have imposed increasingly stringent requirements on spacecraft payload capacity. To meet these demands, high power spacecraft with multiple large antenna reflectors are desirable.

Launch vehicle compatibility is a second requirement faced by a spacecraft designer. The increased performance requirements are only advantageously met if compatibility with conventional, commercially available launch vehicles is maintained. Accordingly, a spacecraft, as configured for launch, is desirably made compatible with fairing envelope constraints of such launch vehicles as, for example, Ariane V, Atlas XEPF, Proton, and Sea Launch. As a result, it is very often a requirement to reconfigure a spacecraft from a launch configuration to an on-orbit configuration by repositioning one or more deployable elements from a stowed (launch) position to a deployed (on-orbit) position. The deployable elements may include large antenna reflectors, photovoltaic panels, thermal radiating panels, imaging devices, or other components. Some techniques related to this requirement are disclosed in U.S. Pat. Nos. 8,789,796, 8,448,902, and U.S. patent application Ser. No. 13/215,929, the disclosures of which are hereby incorporated by reference in their entirety.

Improved techniques for reconfiguring a spacecraft from a launch configuration to an on-orbit configuration are desirable.

SUMMARY

The present inventors have appreciated that a spacecraft may be configured with deployable elements where moving the deployable elements from a stowed location to a deployed location using is accomplished by means other than the arrangements with which the reflector is attached to the spacecraft in the launch configuration and in the on-orbit configuration. Instead, in some implementations, the deployable elements may be moved from the stowed location to the deployed location by a mechanism which may be or include a multipurpose manipulator configured for grasping and moving any number of deployable elements.

According to some implementations a spacecraft includes a main body structure and at least a first deployable element. The spacecraft is reconfigurable from a launch configuration to an on-orbit configuration, where, in the launch configuration, the first deployable element is mechanically attached with the spacecraft main body structure by way of a first arrangement, in the on-orbit configuration, the first deployable element is mechanically attached with the spacecraft main body structure by way of a second arrangement, and, in a transition configuration, intermediate to the launch configuration and the on-orbit configuration, both the first arrangement and the second arrangement are detached from the first deployable element.

In some examples, the spacecraft may further include a structural interface adapter for mating to a launch vehicle, an aft surface disposed proximate to the structural interface adapter, a forward surface disposed opposite to the aft surface, and a main body structure disposed between the aft surface and the forward surface. In the launch configuration, the first deployable element may be disposed forward of the forward surface and, in the on-orbit configuration, may be disposed, deployed, so as to be substantially outboard of the main body structure. The first deployable element may be an antenna reflector having an aperture plane, and, in the launch configuration, the antenna reflector may be disposed with the aperture plane substantially parallel to the forward surface. In the launch configuration, a centroid of the aperture plane may be substantially aligned with a launch vehicle longitudinal axis.

In some examples, the first arrangement may be a launch holddown device and the second arrangement may include one or more of a spacecraft structural element, a hinged joint, an actuator, a two axis positioning mechanism, and a three axis positioning mechanism.

In some examples, in the transition configuration, the first deployable element may be coupled with the spacecraft only by way of a mechanical linkage, the mechanical linkage including a manipulator. The manipulator may be configured to grasp the first deployable element, move the first deployable element from a first position proximate to the first arrangement to a second position proximate to the second arrangement, and release the first deployable element. The manipulator may be further configured to attach the deployable element to the second arrangement.

In some examples, the spacecraft may further include at least a second deployable element. The manipulator may be configured to grasp the second deployable element, move the second deployable element, and release the second deployable element. The manipulator may be a self relocatable robotic arm, the robotic arm including at least two end effectors, and a plurality of articulable joints disposed between the at least two end effectors.

According to some implementations a method includes reconfiguring a spacecraft from a launch configuration to an on-orbit configuration. The spacecraft includes a main body structure and at least a first deployable element. In the launch configuration, the first deployable element is mechanically attached with the spacecraft main body structure by way of a first arrangement. In the on-orbit configuration, the first deployable element is mechanically attached with the spacecraft main body structure by way of a second arrangement. In a transition configuration, intermediate to the launch configuration and the on-orbit configuration, both the first arrangement and the second arrangement are detached from the first deployable element. Reconfiguring includes detaching the first deployable element from the first arrangement, moving the first deployable element with respect to the spacecraft main body structure, and attaching the first deployable element to the second arrangement.

BRIEF DESCRIPTION OF THE DRAWINGS

Features of the invention are more fully disclosed in the following detailed description of the preferred embodiments, reference being had to the accompanying drawings, in which like reference numerals designate like structural element, and in which.

DETAILED DESCRIPTION

Specific exemplary embodiments of the invention will now be described with reference to the accompanying drawings. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

It will be understood that when a feature is referred to as being "connected" or "coupled" to another feature, it can be directly connected or coupled to the other feature, or intervening e feature s may be present. Furthermore, "connected" or "coupled" as used herein may include wirelessly connected or coupled. It will be understood that although the terms "first" and "second" are used herein to describe various features, these features should not be limited by these terms. These terms are used only to distinguish one feature from another feature. Thus, for example, a first user terminal could be termed a second user terminal, and similarly, a second user terminal may be termed a first user terminal without departing from the teachings of the present invention. As used herein, the term "and/or" includes any and all combinations of one or more of the associated listed items. The symbol "/" is also used as a shorthand notation for "and/or".

The terms "spacecraft", "satellite" and "vehicle" may be used interchangeably herein, and generally refer to any orbiting satellite or spacecraft system.

Figure 1:
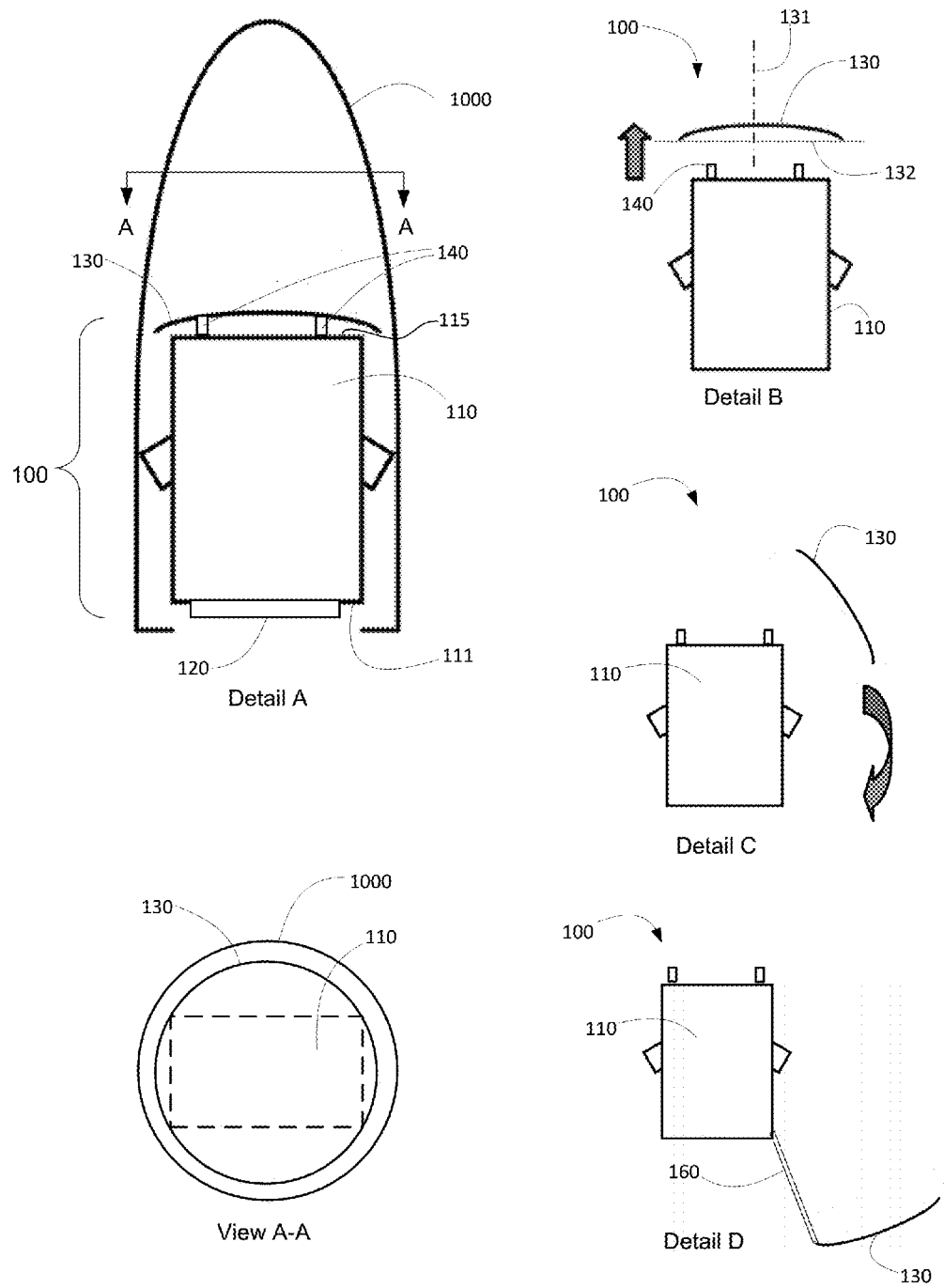
FIG. 1 illustrates an example of a spacecraft reconfigurable from a launch configuration to an on-orbit configuration in accordance with an implementation.

FIG. 1 illustrates an example of a spacecraft reconfigurable from a launch configuration to an on-orbit configuration in accordance with an implementation. Referring first to Detail A, a spacecraft 100 is depicted, as configured in a launch configuration, within a launch vehicle fairing 1000. The spacecraft 100 may include a main body structure 110 disposed between and defining an aft surface 111 and a forward surface 115. The aft surface 111 may be disposed proximate to a structural interface adapter 120. The structural interface adapter 120 may be configured to mate with a launch vehicle upper stage (not illustrated). In the illustrated limitation a deployable element 130 is disposed, in the launch configuration, forward of forward surface 115. As depicted in detail B, the deployable element 130 may be an antenna reflector antenna reflector and include a rigid, curved surface defining a bore sight 131 and an aperture plane 132 substantially orthogonal thereto.

Referring again to Detail A, antenna reflector 130, may be disposed, in the launch configuration, such that its aperture plane 132 is substantially parallel to the forward surface (i.e., orthogonal to the longitudinal axis 1001 of the launch vehicle fairing 1000). As a result, where, as may be observed in View A-A, reflector 130 has a substantially circular perimeter, a diameter of the reflector 130 may be nearly as large as a diameter of the launch vehicle fairing 1000.

In the launch configuration, the deployable element 130 may be mechanically attached with the spacecraft main body 110 by way of one or more structural arrangements 140. Each arrangement 140 may include a separable mechanical linkage between the deployable element 130 and the spacecraft main body 110. For example the arrangement 140 may, in the launch configuration, be configured to rigidly couple the deployable element 130 with the spacecraft main body 110, and be configured to withstand dynamic launch loads. The arrangement 140 may include a release mechanism (not illustrated). Actuation of the release mechanism may result in detaching the deployable element 130 from the spacecraft main body 110. As a result of being detached the deployable element 130 may be free to be moved into the on-orbit configuration as described below.

Referring now to Detail B, a configuration is illustrated that may occur as part of a transition between the launch configuration illustrated in detail A and the on-orbit configuration illustrated in Detail D. In the illustrated "transition configuration" of Detail B, the arrangements 140 have been detached and the deployable element 130 has been separated a distance forward of the forward surface 115 of the spacecraft main body 110.

In a second transition configuration illustrated in Detail C, the deployable element 130 is depicted as being rotated substantially outboard of the spacecraft main body toward a position consistent with a desired on-orbit configuration (Detail D).

Referring now to Detail D, the spacecraft 100 is illustrated in the on-orbit configuration. In the illustrated on-orbit condition, the deployable element 130 is mechanically attached with the spacecraft body 110 by way of second structural arrangement 160 in a position that is substantially outboard of the main body structure. In some implementations, the structural arrangement 160 may be a boom or yoke having an articulable connection with the spacecraft main body 110. For example, the structural arrangement 160 may include one or more hinged joints and/or actuators. In other implementations, the arrangement 160 may be fixedly attached with the spacecraft main body 110. In some implementations the arrangement 160 may include a two or three axis positioning mechanism configured to steer the deployable element 130.

It should be noted that in a transition configuration (e.g., as illustrated in Detail B and in Detail C) the arrangement 160 is detached from the antenna reflector. Thus, in any transition configuration, the antenna reflector is not coupled with the spacecraft main body by either arrangement 140 or arrangement 160. As will be described in more detail hereinbelow, in some implementations the transition configuration includes the deployable element 130 being coupled with the spacecraft only by way of a mechanical linkage (not illustrated) between the deployable element 130 and the spacecraft main body 110. The mechanical linkage may include a manipulator, for example a ground controlled telerobotic arm or other remote manipulator. In some implementations, the remote manipulator may be a self-relocatable manipulator that includes one or more features described in U.S. Pat. No. 4,585,388 and U.S. Pat. No. 4,929,009, the disclosures of which are hereby incorporated by reference into the present application.

Figure 2:
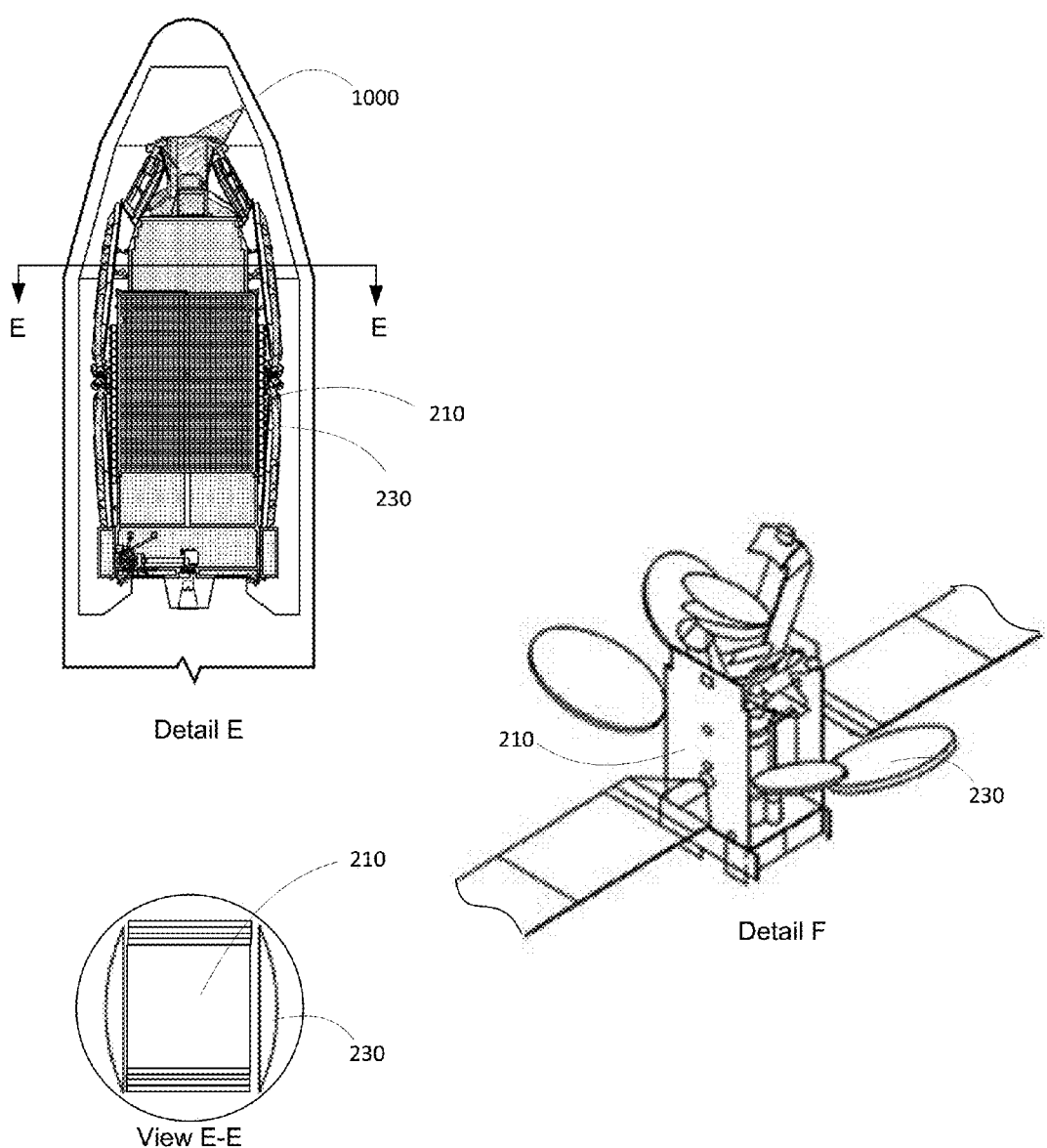
FIG. 2 illustrates an example of a spacecraft arranged in the absence of the present teachings.

Features and benefits of the presently disclosed techniques may be better appreciated by comparing the above-described configurations with a spacecraft arranged in the absence of the present teachings, as illustrated in FIG. 2. In the launch configuration illustrated in Detail E, antenna reflectors 230 are stowed against exterior walls of spacecraft main body 210. As may be observed in view E-E, a consequence of this arrangement is that a diameter of the antenna reflector 230 must be substantially smaller than a diameter of launch vehicle fairing 1000. Detail F shows the spacecraft in a launch configuration in which the reflectors 230 have been deployed. Conventionally, each reflector 230 may be deployed with a respective mechanism that has one or more degrees of freedom. Each mechanism is ordinarily permanently attached (tethered) at one extremity to the spacecraft and at another extremity to the reflector.

The present inventors have appreciated that a spacecraft may be configured with deployable elements that are more numerous and/or larger in size than has been contemplated by the prior art where moving the deployable elements from a stowed location to a deployed location using is accomplished by means other than the arrangements with which the reflector is attached to the spacecraft in the launch configuration and in the on-orbit configuration. Instead, in some implementations, the deployable elements may be moved from the stowed location to the deployed location by a mechanism which may be or include a multipurpose manipulator configured for grasping and moving any number of deployable elements. The presently disclosed techniques permit the arrangements supporting the deployable elements on-orbit to be considerably simplified, and have lower mass and cost than conventional arrangements.

Referring again to FIG. 1, when the deployable element 130 is a rigid antenna reflector, the reflector may be arranged in the launch configuration above the spacecraft main body, with the aperture plane parallel to the spacecraft forward surface (i.e., orthogonal to a launch vehicle longitudinal axis). As a result, the diameter of a circular reflector can be nearly as large as the launch vehicle fairing diameter.

Figure 3:
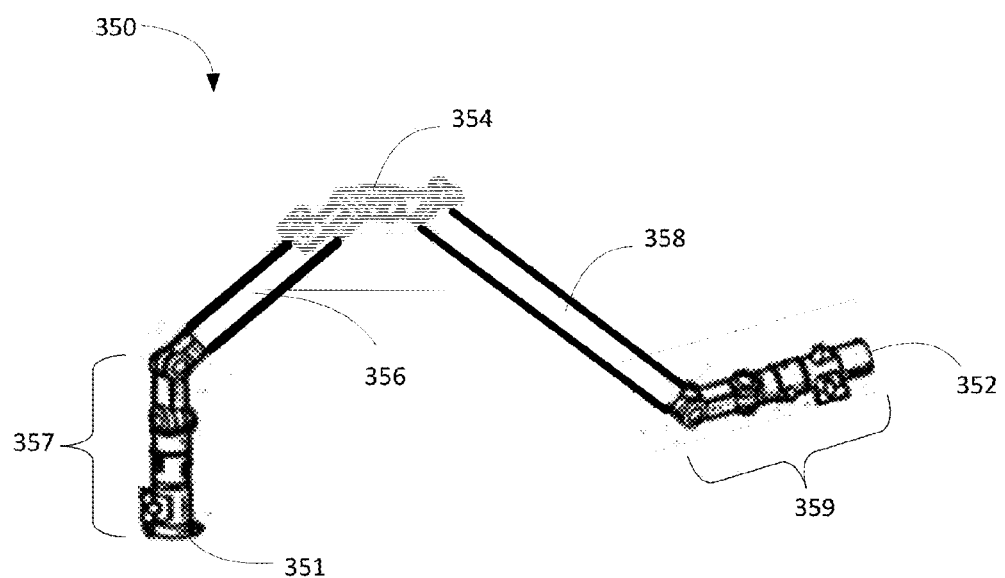
FIG. 3 illustrates an example of a multipurpose manipulator, according to an implementation.

In some implementations, the multipurpose manipulator may include a robotic arm having two end effectors and several articulable joints disposed therebetween. For example, referring now to FIG. 3 example of a multipurpose manipulator will be described. Manipulator 350 includes first and second longitudinally elongated arms 356 and 358. Respective proximal ends of the arms 356 and 358 may be coupled together by means an elbow joint 354. Articulator 357 including one or more articulable joints may be coupled with a distal end of arm 356. Similarly, articulator 359 may be coupled with a distal end of arm 358. In some implementations one or both of the articulator 357 and the articulator 359 includes a pitch joint, a yaw joint, and a roll joint. First and second end effectors 351 and 352 may be mounted at the respective distal ends of the articulators 357 and 359.

Figure 4:
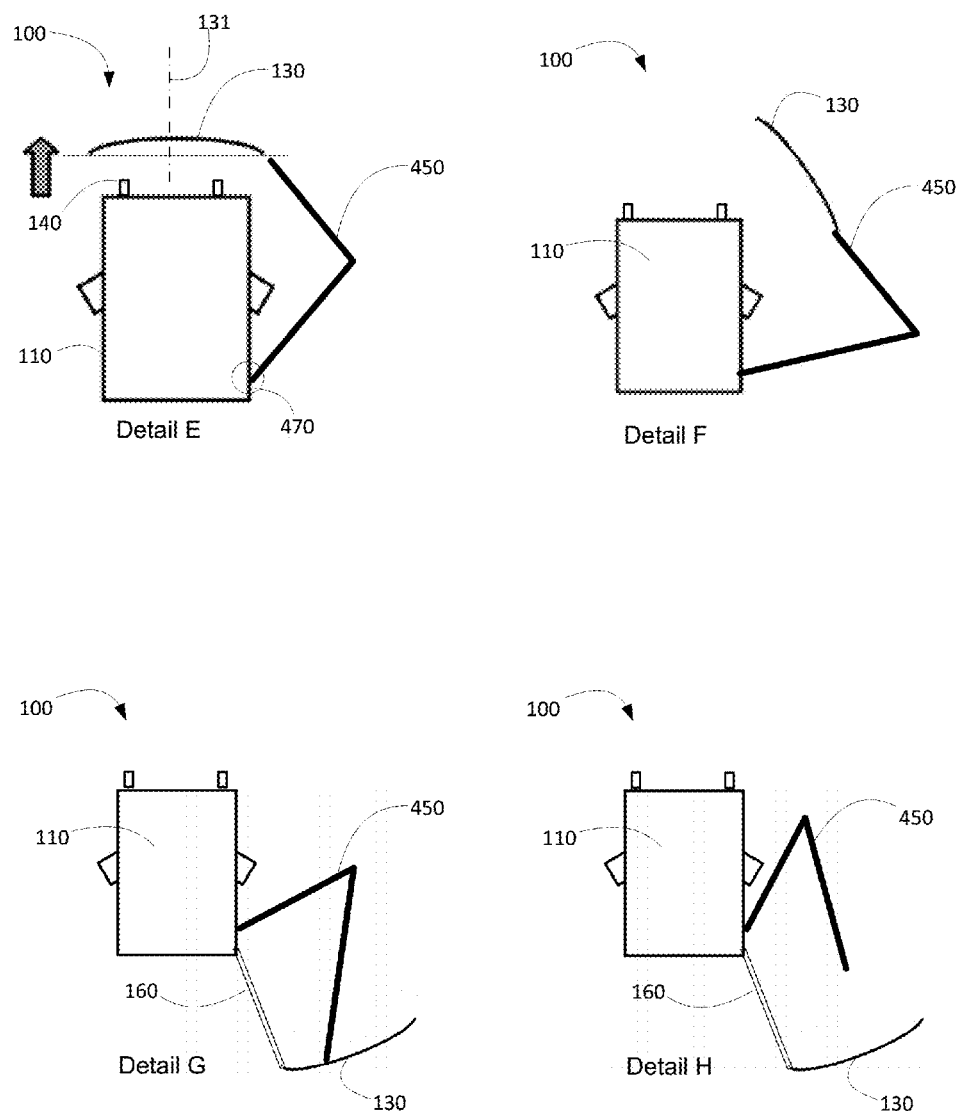
FIG. 4 illustrates techniques for moving a deployable element from a first position to a second position, according to an implementation.

Referring now to FIG. 4, techniques wherein a manipulator 450 is used to move a deployable element 130 from a position associated with the launch configuration to a position associated with the on-orbit configuration will be described. Referring now to Detail E of FIG. 4, a configuration is illustrated that may occur as part of a transition between the launch configuration the on-orbit configuration. In the illustrated "transition configuration" of Detail E, the arrangements 140 have been detached and the deployable element 130 has been moved away from the spacecraft main body 110 by the manipulator 450. The manipulator 450 may include a proximal portion having a first end effector that is attached to the spacecraft main body 110 at a location 470. The location 470 may include a grappling fixture (not illustrated) with which the first end effector of the manipulator 450 is configured to connect. A distal portion of the manipulator 450 may include a second end effector that is detachably engaged with the deployable element 130.

In a second transition configuration illustrated in Detail F, the deployable element 130 is depicted as having been translated and rotated, by the manipulator 450, with respect to the spacecraft main body 110 toward a position consistent with a desired on-orbit configuration (Detail G).

Referring now to Detail G, it is illustrated that the manipulator 450 has positioned the deployable element 130 proximate to a desired on-orbit location. More particularly, in the illustrated configuration, the deployable element 130 has been positioned proximate to the second arrangement 160 such that it may be mechanically attached with the spacecraft body 110 by way of the second structural arrangement 160. In some implementations, the manipulator 450 may be configured to attach the deployable element 130 to the second arrangement 160. Subsequent to attaching the deployable element 130 to the second arrangement 160, the second end effector of the manipulator 450 may be detached and separated from the deployable element 130 (Detail H).

Figure 5:
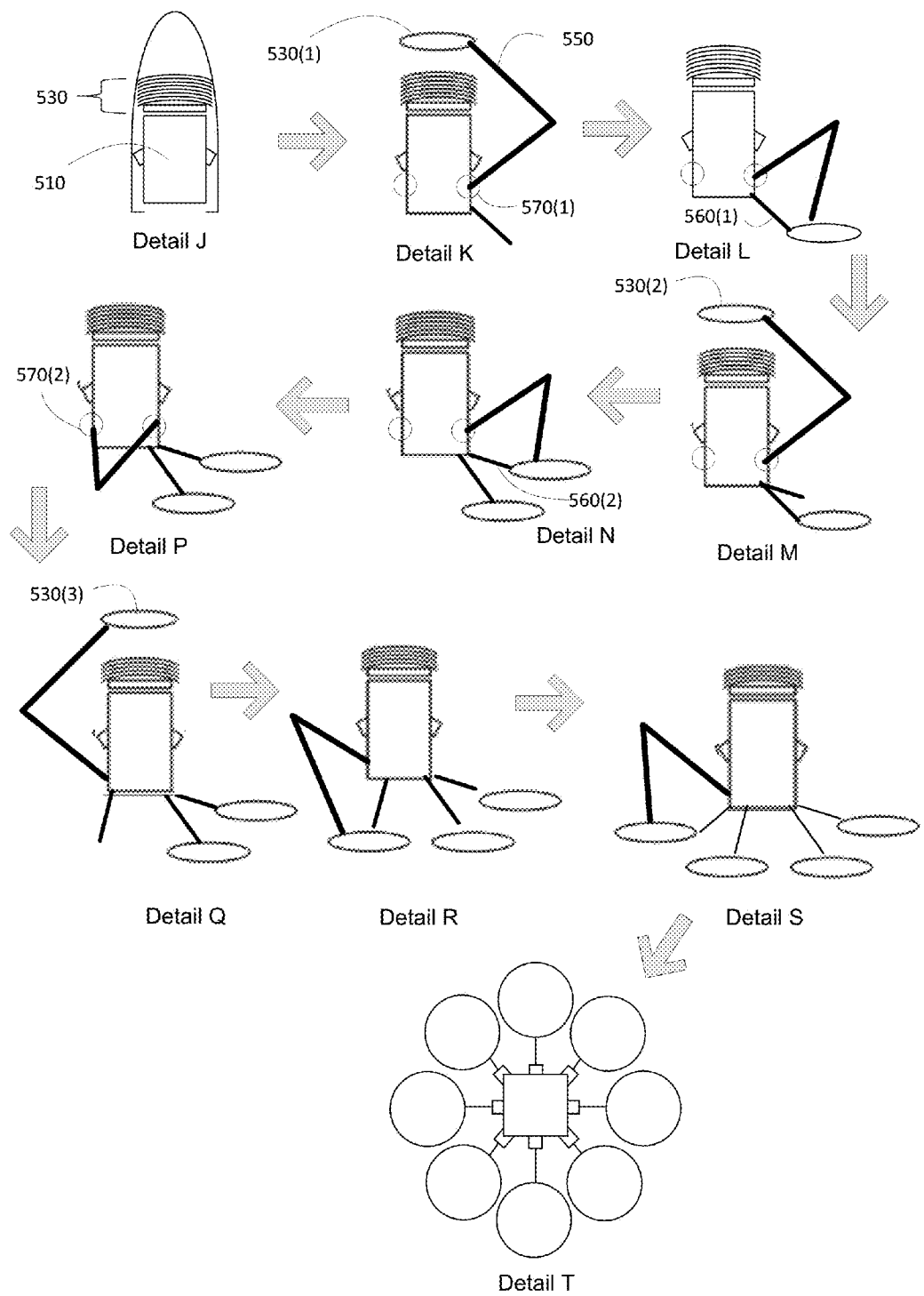
FIG. 5 illustrates techniques for on-orbit assembly of a communications satellite, according to an implementation.

Referring now to FIG. 5, techniques wherein a manipulator 450 is used to move multiple deployable elements 130 from positions associated with the launch configuration to positions associated with the on-orbit configuration will be described. Referring now to Detail J of FIG. 5, a launch configuration is illustrated wherein multiple antenna reflectors 530 are disposed forward of a forward surface of the spacecraft main body structure 510. The antenna reflectors 530 may be mechanically attached with the spacecraft main body 110 by mechanical structural arrangements (not illustrated). In some implementations, the mechanical structural arrangements may be similar to arrangements 140 described previously in connection with FIG. 1.

Referring now to Details K through S of FIG. 5, configurations are illustrated that may occur during transition between the launch configuration the on-orbit configuration. In the illustrated transition configuration of Detail K, a first antenna reflector 530(1) has been detached and the antenna reflector 530(1) has been moved away from the spacecraft main body 510 by a manipulator 550. The manipulator 550 may include a proximal portion having a first end effector that is attached to the spacecraft main body 110 at a location 570(1). The location 570(1) may include a first grappling fixture (not illustrated) with which the first end effector of the manipulator 550 is configured to connect. A distal portion of the manipulator 550 may include a second end effector that is detachably engaged with the antenna reflector 530(1).

In a second transition configuration illustrated in Detail L, the antenna reflector 530(1) is depicted as having been translated and rotated, by the manipulator 550, with respect to the spacecraft main body 510, into a position consistent with a desired on-orbit configuration. More particularly, it is illustrated that the manipulator 550 has positioned the deployable element 530(1) proximate to an arrangement 560(1) such that it may be mechanically attached with the spacecraft body 110 by way of the arrangement 560(1). In some implementations, the manipulator 450 may be configured to attach the deployable element 530(1) to the arrangement 560(1). Subsequent to attaching the deployable element 530(1) to the arrangement 560(1), the second end effector of the manipulator 550 may be detached and separated from the antenna reflector 530(1).

As illustrated in Detail M and Detail N of FIG. 5, the preceding two steps may be repeated with respect to a second antenna reflector 530(2). Thus, in the third illustrated transition configuration of Detail M, a second antenna reflector 530(2) has been detached and the antenna reflector 530(2) has been moved away from the spacecraft main body 510 by the manipulator 550. In the fourth transition configuration illustrated in Detail N, the antenna reflector 530 (3) is depicted as having been translated and rotated, by the manipulator 550, with respect to the spacecraft main body 510, into a position consistent with a desired on-orbit configuration. More particularly, it is illustrated that the manipulator 550 has positioned the deployable element 530(2) proximate to an arrangement 560(2) such that it may be mechanically attached with the spacecraft body 110 by way of the arrangement 560(2). In some implementations, the manipulator 450 may be configured to attach the deployable element 530(2) to the arrangement 560(2). Subsequent to attaching the deployable element 530(2) to the arrangement 560(2), the second end effector of the manipulator 550 may be detached and separated from the antenna reflector 530(2).

In some implementations, on-orbit assembly of a plurality of antenna reflectors 530 to the spacecraft main body 510 may include relocating the manipulator 550 with respect to the spacecraft main body 510. As illustrated in Detail P, in a fifth transition configuration, the second end effector of the manipulator 550 may be engaged, at location 570(2), with a second grappling fixture (not illustrated). Subsequently, the first end effector of the manipulator 550 may be disengaged from the first grappling fixture.

Thus, in the sixth transition configuration illustrated in Detail Q, the first end effector of the manipulator 550 may be detachably engaged with the antenna reflector 530(3) and assembly of the plurality of antenna reflectors 530 to the spacecraft main body 510 may continue as illustrated, for example, in Detail R and Detail S.

As a result of the above summarized assembly sequence, a complex spacecraft including an arrangement of multiple antenna reflectors such as illustrated in Detail T may be assembled on-orbit.

In the example implementation illustrated in FIG. 5, a stack of eight antenna reflectors 530 is disposed forward of the forward surface of the spacecraft main body structure 510. It should be noted that any number of other launch configuration arrangements are within the contemplation of the present disclosure. For example there may be multiple stacks of deployable elements, disposed forward or aft of the forward surface of the spacecraft main body structure 510. Furthermore, in some implementations one or more reflectors may have an aperture plane orthogonal to the forward surface (i.e., parallel to a longitudinal axis of the launch vehicle).

Figure 6:
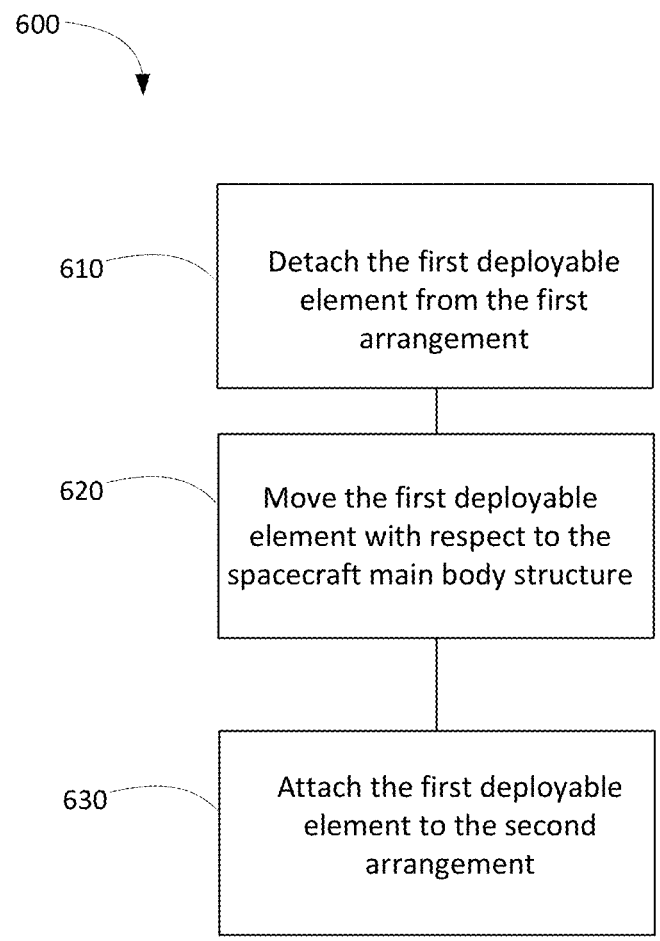
FIG. 6 illustrates a process flow diagram for reconfiguring a spacecraft from a launch configuration to an on-orbit configuration, according to an implementation.

FIG. 6 illustrates a process flow diagram for reconfiguring a spacecraft from a launch configuration to an on-orbit configuration. As described hereinabove the spacecraft may include a main body structure and at least a first deployable element. In the launch configuration, the first deployable element is mechanically attached with the spacecraft main body structure by way of a first arrangement. The first arrangement may be or include a launch holddown device, for example. In the on-orbit configuration, the first deployable element is mechanically attached with the spacecraft main body structure by way of a second arrangement. The second arrangement may be or include a hinged joint, an actuator, a two axis positioning mechanism, and a three axis positioning mechanism, for example. In a transition configuration, intermediate to the launch configuration and the on-orbit configuration, both the first arrangement and the second arrangement are detached from the first deployable element. The method 600 may start, at block 610 with detaching the first deployable element from the first arrangement. At block 620 the first deployable element may be moved with respect to the spacecraft main body structure. For example the first deployable element may be moved using a manipulator. During the moving process of block 620 the first deployable element may be detached from both the first arrangement and the second arrangement. In some implementations, the first deployable element may be moved from a first position proximate to the first arrangement to a second position proximate to the second arrangement. The method 600 may finish, at block 630, with attaching the first deployable element to the second arrangement.

Thus, improved techniques for on-orbit assembly of a communications satellite, including reconfiguring the satellite from a launch configuration to an on-orbit configuration, have been described. The foregoing merely illustrates principles of the invention. It will thus be appreciated that those skilled in the art will be able to devise numerous systems and methods which, although not explicitly shown or described herein, embody said principles of the invention and are thus within the spirit and scope of the invention as defined by the following claims.

What is claimed is:

1. A spacecraft, comprising:
a main body structure; and
at least a first deployable element,
the spacecraft being reconfigurable from a launch configuration to an on-orbit configuration, wherein:
in the launch configuration, the first deployable element is mechanically attached with the spacecraft main body structure by way of a first arrangement;
in the on-orbit configuration, the first deployable element is mechanically attached with the spacecraft main body structure by way of a second arrangement; and
in a transition configuration, intermediate to the launch configuration and the on-orbit configuration, both the first arrangement and the second arrangement are detached from the first deployable element.

2. The spacecraft of claim 1, further comprising:
a structural interface adapter for mating to a launch vehicle;
an aft surface disposed proximate to the structural interface adapter;
a forward surface disposed opposite to the aft surface; and
a main body structure disposed between the aft surface and the forward surface; wherein:
in the launch configuration, the first deployable element is disposed forward of the forward surface and, in the on-orbit configuration, is disposed, deployed, so as to be substantially outboard of the main body structure.

3. The spacecraft of claim 2, wherein:
the first deployable element is an antenna reflector having an aperture plane, and,
in the launch configuration, the antenna reflector is disposed with the aperture plane substantially parallel to the forward surface.

4. The spacecraft of claim 3, wherein, in the launch configuration, a centroid of the aperture plane is substantially aligned with a launch vehicle longitudinal axis.

5. The spacecraft of claim 2, wherein the first arrangement is a launch holddown device and the second arrangement includes one or more of a spacecraft structural element, a hinged joint, an actuator, a two axis positioning mechanism, and a three axis positioning mechanism.

6. The spacecraft of claim 1 wherein, in the transition configuration, the first deployable element is coupled with the spacecraft only by way of a mechanical linkage, the mechanical linkage including a manipulator.

7. The spacecraft of claim 6, wherein the manipulator is configured to:
grasp the first deployable element;
move the first deployable element from a first position proximate to the first arrangement to a second position proximate to the second arrangement; and
release the first deployable element.

8. The spacecraft of claim 7, wherein the manipulator is further configured to attach the deployable element to the second arrangement.

9. The spacecraft of claim 6, further comprising at least a second deployable element, wherein the manipulator is configured to:
grasp the second deployable element;
move the second deployable element; and
release the second deployable element.

10. The spacecraft of claim 6, wherein the manipulator is a self relocatable robotic arm, the robotic arm including at least two end effectors, and a plurality of articulable joints disposed between the at least two end effectors.

* * * * *